US011835008B1

(12) United States Patent
Weston et al.

(10) Patent No.: US 11,835,008 B1
(45) Date of Patent: Dec. 5, 2023

(54) ENGINE AND ENGINE EXHAUST CONTROL SYSTEM

(71) Applicant: FORD GLOBAL TECHNOLOGIES, LLC, Dearborn, MI (US)

(72) Inventors: Keith Weston, Canton, MI (US); Brendan F. Diamond, Grosse Pointe, MI (US); Michael Alan McNees, Flat Rock, MI (US); Victor Martinez, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/153,723

(22) Filed: Jan. 12, 2023

(51) Int. Cl.
*F02D 41/28* (2006.01)
*F01N 1/16* (2006.01)
*G06F 3/01* (2006.01)
*G06V 40/20* (2022.01)

(52) U.S. Cl.
CPC ............ *F02D 41/28* (2013.01); *F01N 1/168* (2013.01); *G06F 3/017* (2013.01); *G06V 40/28* (2022.01); *F02D 2041/281* (2013.01); *F02D 2200/101* (2013.01)

(58) Field of Classification Search
CPC .... F01N 1/168; F02D 41/28; F02D 2041/281; F02D 2200/101; G06F 3/017; G06V 40/20–28
See application file for complete search history.

(56) References Cited

U.S. PATENT DOCUMENTS

| 6,853,887 B1 | 2/2005 | Greenwell |
| 9,702,315 B1 * | 7/2017 | Palmer .................... G07C 5/008 |
| 10,156,906 B2 * | 12/2018 | Yamamoto .......... G06F 3/04883 |
| 10,166,995 B2 * | 1/2019 | Beauvais .............. B60R 25/257 |
| 10,691,221 B2 * | 6/2020 | DeBates ................. G06F 1/163 |
| 11,002,166 B2 * | 5/2021 | Ravi ....................... F01N 9/00 |
| 2010/0136944 A1 | 6/2010 | Taylor et al. |
| 2016/0167621 A1 | 6/2016 | Luu et al. |
| 2016/0340940 A1 | 11/2016 | Krishnan |

(Continued)

FOREIGN PATENT DOCUMENTS

| CN | 106476902 B * | 5/2021 | ......... B60R 25/2045 |
| WO | WO-2014181146 A1 * | 11/2014 | .......... G05D 1/0016 |
| WO | 2020151468 A1 | 7/2020 | |

*Primary Examiner* — Phutthiwat Wongwian
*Assistant Examiner* — Mark L. Greene
(74) *Attorney, Agent, or Firm* — Vincent Mastrogiacomo; Brooks Kushman P.C.

(57) ABSTRACT

A vehicle system includes an engine, a transmission, an exhaust system, an adjustable valve, a sensor, and a controller. The engine is configured to propel a vehicle. The transmission is configured to transfer power from the engine to at least one drive wheel. The exhaust system is configured to route exhaust away from the engine. The exhaust system has a catalyst and an outlet. The adjustable valve is disposed within the exhaust system proximate to the outlet. The sensor is configured to observe human gestures. The controller is programmed to receive signals from the sensor indicative of the human gestures while the transmission is in a parked gear. The controller is further programmed to, in response to the sensor observing a first human gesture, increase an operating speed of the engine or adjust the valve to increase a noise output from the outlet of the exhaust system.

20 Claims, 2 Drawing Sheets

(56) References Cited

U.S. PATENT DOCUMENTS

| | | |
|---|---|---|
| 2017/0129335 A1 | 5/2017 | Lu et al. |
| 2020/0324650 A1* | 10/2020 | Erwin .................... G07C 5/085 |
| 2021/0164194 A1* | 6/2021 | Nishi .................... E02F 9/2004 |
| 2022/0107637 A1 | 4/2022 | Chan et al. |
| 2022/0137616 A1 | 5/2022 | Martin et al. |

* cited by examiner

ENGINE AND ENGINE EXHAUST CONTROL SYSTEM

TECHNICAL FIELD

The present disclosure relates to vehicles having powertrains that include engines and control systems for such powertrains.

BACKGROUND

Vehicles may include engines that are configured to generate power for one or more drive wheels.

SUMMARY

A vehicle system includes an engine, a sensor, and a controller. The engine is configured to propel a vehicle. The sensor is configured to observe human gestures external to the vehicle. The controller is programmed to receive signals from the sensor indicative of the human gestures while the vehicle is in a parked gear. The controller is further programmed to, in response to the sensor observing a first human gesture, increase an operating speed of the engine. The controller is further programmed to, in response to the sensor observing a second human gesture, decrease the operating speed of the engine.

A vehicle system includes an engine, a transmission, an exhaust system, an adjustable valve, a sensor, and a controller. The engine is configured to propel a vehicle. The transmission is configured to transfer power from the engine to at least one drive wheel. The exhaust system is configured to route exhaust away from the engine. The exhaust system has a catalyst and an outlet. The adjustable valve is disposed within the exhaust system proximate to the outlet. The sensor is configured to observe human gestures. The controller is programmed to receive signals from the sensor indicative of the human gestures while the transmission is in a parked gear. The controller is further programmed to, in response to the sensor observing a first human gesture, increase an operating speed of the engine or adjust the valve to increase a noise output from the outlet of the exhaust system.

A vehicle system includes an engine, an exhaust system, an adjustable valve, a sensor, and a controller. The engine is configured to propel a vehicle. The exhaust system is configured to route exhaust away from the engine. The adjustable valve is disposed within the exhaust system. The sensor configured to observe human gestures. The controller is programmed to receive signals from the sensor indicative of the human gestures while the vehicle is in a parked gear. The controller is further programmed to, in response to the sensor observing a first human gesture, adjust the valve to increase a noise output from the exhaust system. The controller is further programmed to, in response to the sensor observing a second human gesture, adjust the valve to decrease a noise output from the exhaust system.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
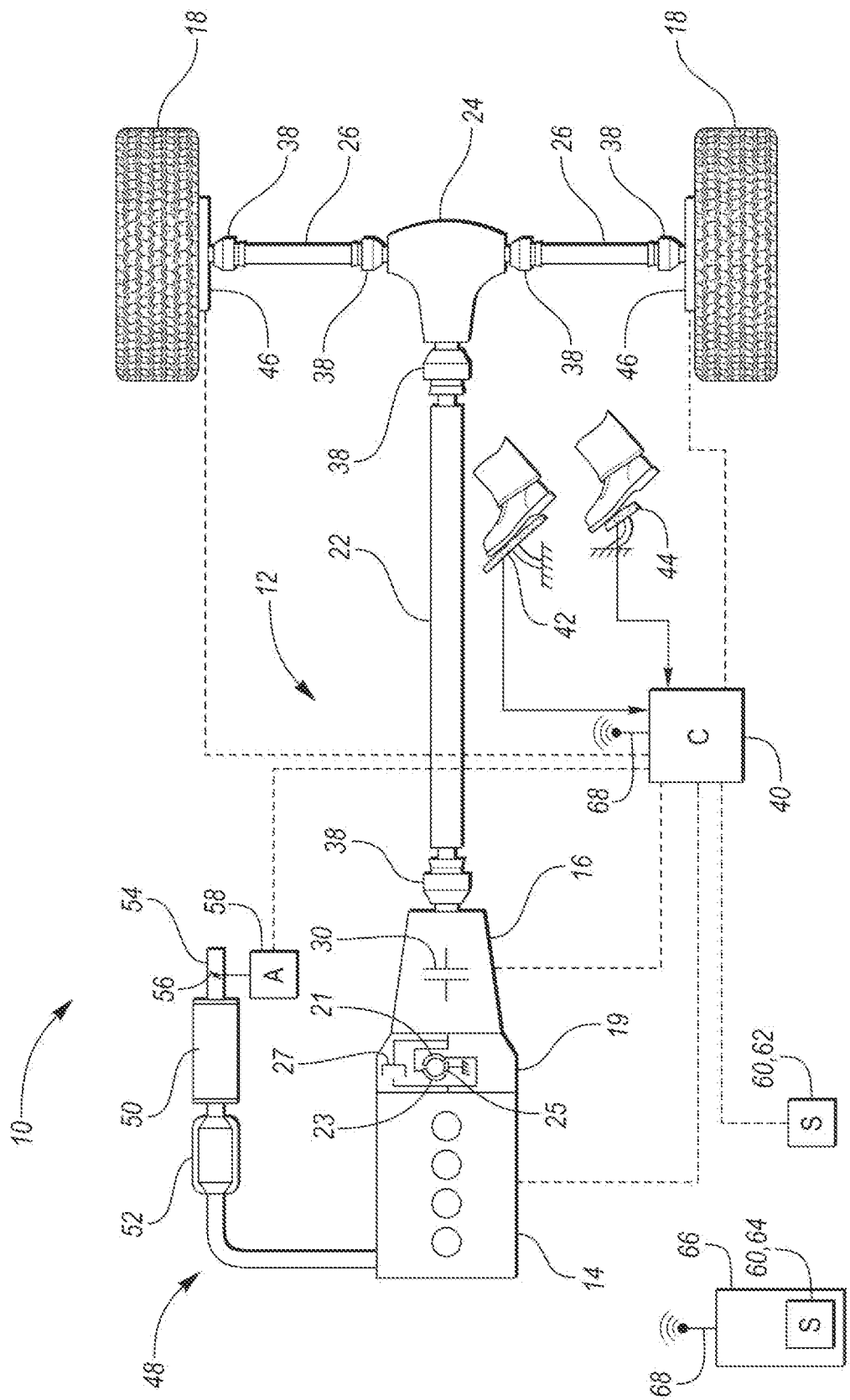
FIG. 1 is a schematic diagram representative of an exemplary vehicle and an exemplary vehicle powertrain.

Referring to FIG. 1, a schematic diagram representative of a vehicle system or vehicle 10 and a vehicle powertrain 12 is illustrated. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain. The powertrain 12 may include an engine 14 and a transmission 16. The engine 14 is configured to generate power to propel the vehicle 10. The transmission 16 may be a multiple step-ratio automatic transmission. The powertrain 12 may utilize other power generating components (e.g., electric motors or fuel cells) in addition to the engine 14. The transmission 16 may be configured to provide multiple gear ratios between an input and an output of the transmission 16. The engine 14 is connected to the input of the transmission 16. The transmission 16 is configured to transfer power from the engine 14 to drive wheels 18 to propel the vehicle. More specifically, drivetrain components that are connected to an output of the transmission 16 are configured deliver power from the transmission 16 to the drive wheels 18.

The transmission 16 may be placed in PRNDSL (park, reverse, neutral, drive, sport, low) via a transmission range selector (not shown). Park is a non-moving gear where the vehicle 10 remains stationary. Reverse, drive, sport, and low are all moving gears where the vehicle 10 may be propelled between locations. Neutral may be a non-moving gear because power may not flow through the powertrain 12 to the drive wheels 18. However, the wheels 18 may rotate freely while the transmission 16 is in neutral, so neutral may be considered a moving gear if an external force is applied to move the vehicle, which may occur for example during a towing operation.

The engine 14 may be connected to an input shaft of the transmission by a torque converter 19 or a launch clutch while an output shaft of the transmission 16 may be connected to a driveshaft 22. The driveshaft 22 may then be connected to a rear drive unit (RDU) 24. The RDU 24 may then be connected to the drive wheels 18 by half shafts 26. The RDU 24 may include a differential and/or one more clutches to control the power output to the wheels 18.

The torque converter 19 includes an impeller 21 fixed to the crankshaft of the engine 14, a turbine 23 fixed to an input shaft to the transmission 16, and a stator 25 that is grounded such that it does not rotate. The torque converter 19 thus provides a hydraulic coupling between the crankshaft of the engine 14 and the input shaft to the transmission 16. The torque converter 19 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 27 may also be provided that, when engaged, frictionally or mechanically couples the impeller and the turbine of the torque converter 19, permitting more efficient power transfer. The torque converter bypass clutch 27 may be configured to transition between an opened (or disconnected) state, a closed (or locked) state, and a slipping state. The rotation of the impeller 21 and the turbine 23 are synchronized when the torque converter bypass clutch 27 is in the closed or locked state. The rotation of the impeller 21 and the turbine 23 are non-synchronized when the torque converter bypass clutch 27 is in the opened state or the slipping state.

The transmission 16 may include gear sets (not shown) that are selectively placed in different gear ratios by selective engagement of friction elements such as clutches to establish the desired multiple discrete or step drive ratios. More specifically, the transmission 16 may have a plurality of clutches 30 configured to shift the transmission 16 between a plurality of gear ratios. The friction elements are controllable through a shift schedule that connects and disconnects certain elements of the gear sets to control the ratio between a transmission output shaft (e.g., driveshaft 22) and the transmission input shaft (e.g., a shaft connected to the crankshaft of the engine 14). The transmission 16 is automatically shifted from one ratio to another based on various vehicle and ambient operating conditions by an associated controller, such as a powertrain control unit (PCU). Power and torque from the engine 14 may be delivered to and received by transmission 16. The transmission 16 then provides powertrain output power and torque to driveshaft 22.

The various components of the powertrain 12, including the output shaft of the transmission 16, driveshaft 22, RDU 24, half shafts 26, wheels 18, may be connected to each other, as described above, via constant-velocity joints 38. Constant-velocity joints connect two rotating parts and allow the two rotating parts to rotate about different axes.

Although FIG. 1 depicts a rear-wheel drive vehicle, the disclosure should not be construed as limited to rear-wheel drive vehicles. For example, the vehicle may be a front wheel drive vehicle that includes a power source (e.g., engine or electric motor) that is connected to a transaxle which in turn is connected to the front wheels. The transaxle may include a differential that is connected to the front wheels by half shafts. Constant-velocity joints may be disposed between any mating parts (e.g., between the half shaft and the wheels or between the half shaft and the transaxle.

The powertrain 12 further includes an associated controller 40 such as a powertrain control unit (PCU). While illustrated as one controller, the controller 40 may be part of a larger control system and may be controlled by various other controllers throughout the vehicle 10, such as a vehicle system controller (VSC). It should therefore be understood that the powertrain control unit 40 and one or more other controllers can collectively be referred to as a "controller" that controls various actuators in response to signals from various sensors to control functions such as starting/stopping engine 14, select or schedule transmission shifts, etc. Controller 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 40 may communicate signals to and/or from engine 14, transmission gearbox 16, torque converter 19, etc. Although not explicitly illustrated, those of ordinary skill in the art will recognize various functions or components that may be controlled by controller 40 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery, clutch pressures for launch clutch and transmission clutch, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component presence, intake air flow (MAF), transmission gear, ratio, or mode, transmission oil temperature (TOT), transmission turbine speed (TS), torque converter bypass clutch 27 status (TCC), or shift mode (MDE) for example.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 42 is used by the driver of the vehicle to provide a desired or demanded torque, power, or drive command to propel the vehicle. In general, depressing and releasing the accelerator pedal 42 generates an accelerator pedal position signal that is representative of an accelerator pedal position and may be interpreted by the controller 40 as a demand for increased power or decreased power, respectively, or as a demand for increased torque or decreased torque, respectively. A brake pedal 44 is also used by the driver of the vehicle to provide a demanded braking torque to slow the vehicle. The brake pedal 44 may configured to actuate friction brakes 46 to slow the vehicle through a hydraulic, electrical, or other system when applied. In general, depressing and releasing the brake pedal 44 generates a brake pedal position signal that may be interpreted by the controller 40 as a demand to decrease the vehicle speed. Based upon inputs from the accelerator pedal 42 and brake pedal 44, the controller 40 commands the torque to the engine 14 and friction brakes 46. The controller 40 also controls the timing of gear shifts within the transmission 16 based on one or more shift schedules that may be stored as tables within the controller. The shift schedules may be based on a demanded torque or power output via the accelerator pedal and a speed of the vehicle.

The vehicle 10 includes an exhaust system 48 that is configured to channel the exhaust produced by the engine 14 away from engine 14 and away from the vehicle 10. The exhaust system 48 may include various conduits or pipes, a muffler 50 to reduce the noise emitted by the exhaust system 48, and a catalytic converter 52. The catalytic converter 52 may be a three-way catalytic converter that is configured to reduce the amount carbon monoxide (CO), unburned hydrocarbons (HC), and oxides of Nitrogen ($NO_x$) that are released into the atmosphere. The catalyst within the catalytic converter 52 may only be operable above a light-off temperature, which is the temperature at which catalytic reactions within the catalytic converter are initiated. An exhaust pipe or exhaust outlet 54 of the exhaust system 48 is downstream of the muffler 50 and catalytic converter 52. An adjustable valve 56 (e.g., a butterfly valve) may be disposed within the exhaust system 48 proximate to the outlet 54. An actuator 58 (e.g., a servo motor) may be configured to transition the valve 56 between closed, fully opened, and partially opened positions to control a noise output of the exhaust system 48. The noise output of the exhaust system 48 increases as the valve 56 transitions toward the fully opened position and decreases as the valve 56 transitions toward the closed position. The actuator 58 may be in communication with and controlled by the controller 40 to adjust the position of the valve 56.

The vehicle 10 may include a sensor 60 that is configured to observe human gestures, particularly gestures that are external to the vehicle. However, the sensor 60 may be configured to observe human gestures of a person that is inside the vehicle 10. The sensor 60 may be a camera 62 that is disposed on the vehicle 10. Alternatively, the sensor 60 may be one or more accelerometers 64 that are disposed on a handheld device 66 (e.g., a cellular phone) that is external to the vehicle 10, wherein the accelerometers 64 are configured to detect hand gestures or movement while the handheld device 66 is being held in user's hand. The handheld device 66 may communicate wirelessly with the controller 40. Each of the handheld device 66 and the controller 40 may be connected to an antenna 68 to establish the wireless communication between the handheld device 66 and the controller 40. Such wireless communication may include, but is not limited to, radio, Bluetooth, Wi-Fi, wireless network, etc. Each antenna 68 may be configured to wirelessly receive signals from various sources, including, but not limited to, cellular towers, satellites, wireless network servers, and the like.

The sensor 60 may be in communication with the controller 40 and may be configured to communicate human gestures to the controller 40. The controller 40 in turn may be configured to receive signals from the sensor 60 that are indicative of the human gestures. The controller 40 may be programmed to control various components or systems of the vehicle 10 in response to the hand gestures. The controller 40 may be programmed to receive the hand gestures or implement controlling the various components or systems of the vehicle 10 only when the vehicle 10, or more specifically the transmission 16, is in the parked gear.

It should be understood that the vehicle configuration described herein is merely exemplary and is not intended to be limited. Other non-hybrid or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), or any other vehicle configuration known to a person of ordinary skill in the art.

Figure 2:
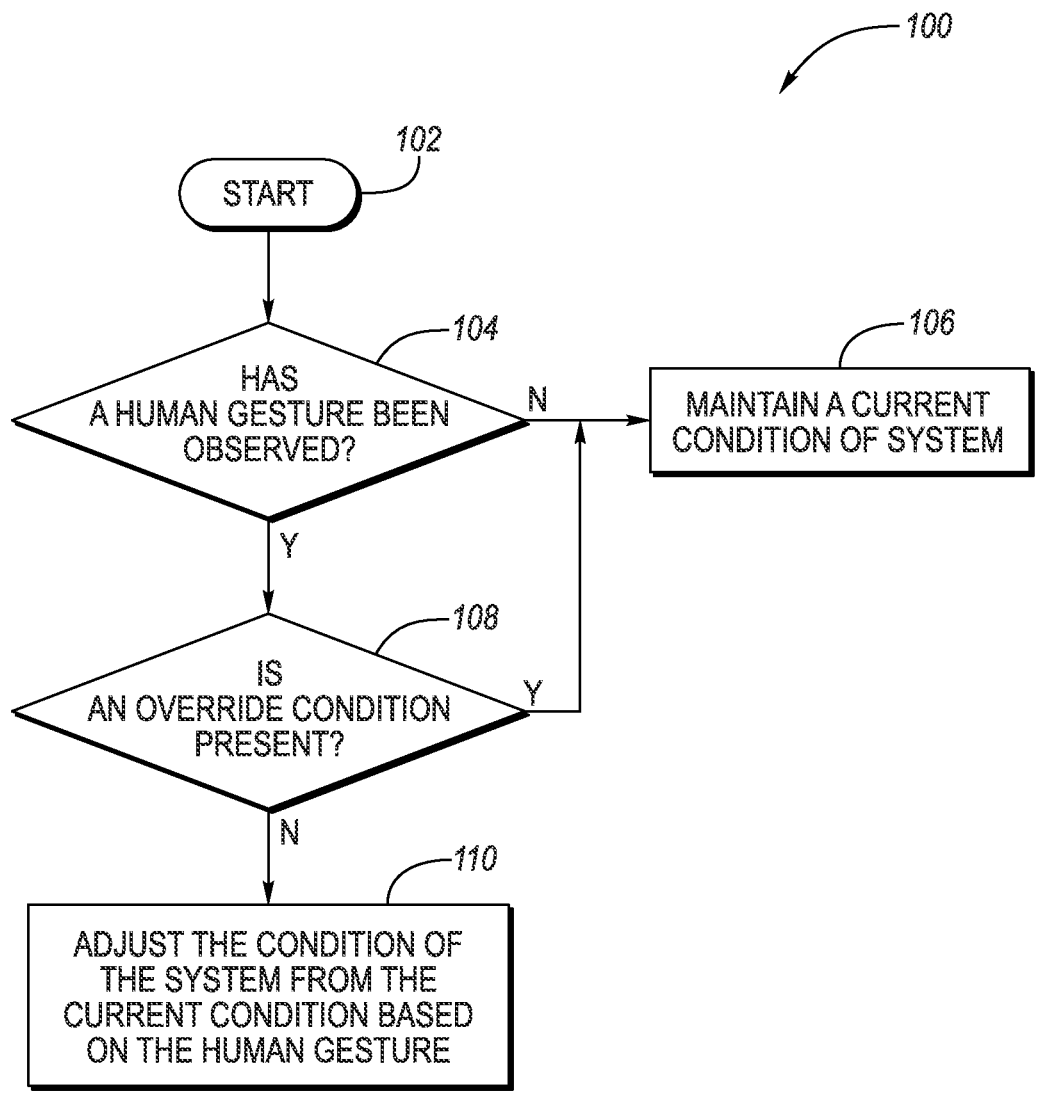
FIG. 2 is flowchart illustrating a method of adjusting a condition of an engine of the vehicle and/or associated exhaust system.

Referring to FIG. 2, a flowchart illustrating a method 100 of adjusting a condition of the engine 14 and/or associated exhaust system 48 is illustrated. The method 100 may be stored as control logic and/or an algorithm within the controller 40. The method 100 begins at start block 102. The method 100 may be initiated once the vehicle 10, or more specifically the transmission 16, is place into a non-moving gear (e.g., a parked gear). Next, the method 100 moves on to block 104 where it determined if a human gesture has been observed (e.g., if a human gesture has been observed by sensor 60). The human gestures may be any type of human gesture, including but not limited to, hand gestures, facial expressions, body orientation, arm or leg positions, etc.

If a human gesture has not been observed, the method 100 moves on to block 106 where one or more of the current conditions of the engine 14 and/or associated exhaust system 48 are maintained. The one or more conditions may be maintained to maintain a current noise output of the engine 14 and/or the associated exhaust system 48. For example, at block 106 the current operating speed of the engine 14 may be maintained and/or the current position of valve 56 may be maintained, which may be for the purpose of maintaining the current noise output of the engine 14 and/or the associated exhaust system 48. Other conditions that may be maintained at block 106 may include the current ON or OFF condition of the engine 14.

If a human gesture has been observed, the method 100 moves on to block 108 where it is determined if an override condition has been observed. If an override condition is observed, the method moves on to block 106. If an override condition is not observed, the method 100 moves on to block 110, where one or more of current conditions of the engine 14 and/or associated exhaust system 48 are adjusted based on the human gesture. For example, at block 110 the speed of the engine 14 may be increased to increase a noise output in response to a first gesture; the speed of the engine 14 may be decreased to decrease a noise output in response to a second gesture; the engine 14 may be started in response to a third gesture; the engine 14 may be shut down in response to a fourth gesture; the increase or decrease in engine speed may be limited to a threshold in response to a fifth gesture; an increase or decrease in engine speed may be limited to a threshold time period in response to a sixth gesture; the position of the valve 56 may adjusted to increase the noise output of the associated exhaust system 48 in response to a seventh gesture; the position of the valve 56 may adjusted to decrease the noise output of the associated exhaust system 48 in response to a eighth gesture; etc.

Different gestures may be utilized to controller different functions. For example, a "thumbs up" may start the engine 14; a "thumbs down" may shut down the engine 14; a hand height may limit a speed of the engine 14 to a maximum or minimum threshold; upward movement of the hand may increase the speed of the engine 14; downward movement of the hand may decrease engine speed; upward or downward movement may adjust the speed of the engine 14 while the engine 14 is being revved; the number of fingers being extended may specify a time duration of the revving of the engine 14; rotation of the hand may control the position of valve 56; a large smile may increase the speed of the engine 14; a frown may decrease the speed of the engine 14; etc.

Returning to block 108, the override conditions may refer to one or more conditions. For example, the override conditions may refer to an engine oil temperature being less than a threshold, an engine coolant temperature being less than a threshold, an engine cylinder head temperature being less than a threshold, a catalyst temperature of the catalytic converter 52 being less than a threshold (e.g., less than the light-off temperature), engine speed exceeding a threshold, the transmission 16 being in a moving gear (e.g., drive, reverse, low, sport, etc.), an oil change reminder being activated, etc.

Method 100 allows a user to auto rev the engine 14 and control the noise output of the exhaust system 48 via gesture recognition, which allows the user to obtain a desired exhaust noise amplitude or note while also being located external to the vehicle 10. This may be particularly advantageous at a car shown, car club, or at any place where the vehicle 10 is parked and the user wishes to demonstrate the power capabilities of the engine 14 to other individuals while also being outside of the vehicle 10. This way the user has the same reference or point of view as the other individuals.

The controller 40 may further be programmed to only allow the human gestures of the owner or those permitted by the owner to control the vehicle according to method 100. The controller 40 may be programmed to limit noise output resulting from implementing method 100 to account for local noise ordinances (e.g., noise output may be limited based on a current global positioning system (GPS) location of the vehicle 10 in correlated with municipal noise ordinances) or in response to a person being in close proximity to the vehicle (e.g., noise output may be limited in response person standing close to the front of the vehicle 10 in proximity to the engine 14 or a person standing close to the rear of the vehicle 10 in close proximity to the outlet 54 of the exhaust system 48).

Geofencing features can also be used to prohibit the use of method 100 in certain areas or auto-enable the method 100 when arriving at specific locations like a car club, hang out parking lot, etc. The vehicle 10 can also limit noise output according to method 100 based on identifying if a person is facing the vehicle, where full noise is expecting by revving the engine 14 or if a person is facing away from the vehicle or walking by, where they may be startled. This can be extended to a learning/programming session for authorized users via SYNC or other identifiable processes.

The auto rev feature settings and applications according to method 100 can also be taught by the user and by the vehicle recognizing another vehicle, person, or being in a specific location. For example, if the vehicle 10 is at a friend's house and is in the driveway, the vehicle 10 may rev the engine 14 if it is in park to alert the friend that the vehicle is present. As another example, if the senor 60 recognizes another vehicle of the same make or model, the method 100 may rev the engine 14 if the vehicle 10, or more specifically the transmission 16, is in park or neutral.

It should be understood that the flowchart in FIG. 2 is for illustrative purposes only and that the method 100 should not be construed as limited to the flowchart in FIG. 2. Some of the steps of the method 100 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle system comprising:
an engine configured to propel a vehicle;
a sensor configured to observe human gestures external to the vehicle; and
a controller programmed to,
receive signals from the sensor indicative of the human gestures while the vehicle is in a parked gear,
in response to the sensor observing a first human gesture, increase an operating speed of the engine, in response to the sensor observing a second human gesture, decrease the operating speed of the engine, and in response to the sensor observing a third human gesture, limit the increase in operating speed of the engine according to the first human gesture to a specified time duration.

2. The vehicle system of claim 1, wherein the controller is further programmed to, in response to the sensor observing a fourth human gesture, start the engine.

3. The vehicle system of claim 1, wherein the controller is further programmed to, in response to the sensor observing a fourth human gesture, shut down the engine.

4. The vehicle system of claim 1 further comprising an exhaust pipe (i) configured to route exhaust away from the engine and (ii) having an adjustable valve disposed therein, and wherein the controller is further programmed to, in response to the sensor observing a fourth human gesture, adjust a position of the valve to control a noise being output from the exhaust pipe.

5. The vehicle system of claim 1, wherein the human gestures are hand gestures.

6. The vehicle system of claim 1, wherein the human gestures are facial expressions.

7. The vehicle system of claim 1, wherein the sensor is a camera that is disposed on the vehicle.

8. The vehicle system of claim 1, wherein the sensor is an accelerometer that is disposed on a handheld device that is external to the vehicle.

9. The vehicle system of claim 1, wherein the controller is further programmed to, in response to the sensor observing (i) the first human gesture and (ii) an override condition, override increasing the operating speed of the engine and maintain a current speed of the engine.

10. The vehicle system of claim 9, wherein the override condition is an engine oil temperature being less than a threshold, an engine coolant temperature being less than a second threshold, an engine cylinder head temperature being less than a third threshold, a catalyst temperature being less than a fourth threshold, engine speed exceeding a threshold, or a transmission being in a moving gear.

11. A vehicle system comprising:
an engine configured to propel a vehicle;
a transmission configured to transfer power from the engine to at least one drive wheel;
an exhaust system configured to route exhaust away from the engine, the exhaust system having a catalyst and an outlet;
an adjustable valve disposed within the exhaust system proximate to the outlet;
a sensor configured to observe human gestures; and
a controller programmed to,
receive signals from the sensor indicative of the human gestures while the transmission is in a parked gear,
in response to the sensor observing a first human gesture, increase an operating speed of the engine or adjust the valve to increase a noise output from the outlet of the exhaust system, and
in response to the sensor observing (i) the first human gesture and (ii) an engine speed exceeding a threshold, override increasing the operating speed of the engine and maintain a current speed of the engine.

12. The vehicle system of claim 11, wherein the controller is further programmed to, in response to, the sensor observing a second human gesture, decrease an operating speed of the engine or adjust the valve to decrease a noise output from the outlet of the exhaust system.

13. The vehicle system of claim 11, wherein the controller is further programmed to, in response to the sensor observing (i) the first human gesture and (ii) the transmission being in a moving gear, override increasing the operating speed of the engine and maintain a current speed of the engine.

14. The vehicle system of claim 11, wherein the controller is further programmed to, in response to the sensor observing (i) the first human gesture and (ii) an engine oil temperature being less than a threshold, override increasing the operating speed of the engine and maintain a current speed of the engine.

15. The vehicle system of claim 11, wherein the controller is further programmed to, in response to the sensor observing (i) the first human gesture and (ii) an engine coolant temperature being less than a threshold, override increasing the operating speed of the engine and maintain a current speed of the engine.

16. The vehicle system of claim 11, wherein the controller is further programmed to, in response to the sensor observing (i) the first human gesture and (ii) an engine cylinder head temperature being less than a threshold, override increasing the operating speed of the engine and maintain a current speed of the engine.

17. The vehicle system of claim 11, wherein the controller is further programmed to, in response to the sensor observing (i) the first human gesture and (ii) a catalyst temperature being less than a threshold, override increasing the operating speed of the engine and maintain a current speed of the engine.

18. A vehicle system comprising:
an engine configured to propel a vehicle;
an exhaust system configured to route exhaust away from the engine;
an adjustable valve disposed within the exhaust system;
a sensor configured to observe human gestures; and
a controller programmed to,
receive signals from the sensor indicative of the human gestures while the vehicle is in a parked gear, and
in response to the sensor observing a first human gesture, adjust the valve or increase an operating speed of the engine to increase a noise output from the exhaust system,
in response to the sensor observing a second human gesture, adjust the valve to decrease a noise output from the exhaust system, and
in response to the sensor observing (i) the first human gesture and (ii) an engine coolant temperature being less than a threshold, override increasing the operating speed of the engine.

19. The vehicle system of claim 18, wherein (i) the exhaust system further comprises a catalyst and (ii) the controller is further programmed to, in response to the sensor observing (a) the first human gesture and (b) a catalyst temperature being less than a second threshold, override increasing the operating speed of the engine.

20. The vehicle system of claim 18, wherein the controller is further programmed to, in response to the sensor observing (i) the first human gesture and (ii) an engine speed exceeding a threshold, override increasing the operating speed of the engine.

* * * * *